United States Patent [19]

Iwaki et al.

[11] 4,250,444
[45] Feb. 10, 1981

[54] VOLTAGE REGULATOR SYSTEM FOR VEHICLE GENERATOR

[75] Inventors: Katsutaro Iwaki, Chiryu; Kazumasa Mori, Aichi; Akira Mase, Handa; Takayasu Nimura, Nagoya; Katsumi Itoh, Oobu; Yoshio Akita, Ichinomiya; Katsuya Muto, Kariya; Taro Asahi, Chiryu; Keiichiro Banzai, Toyota, all of Japan

[73] Assignee: Nippondenso Co., Ltd., Kariya, Japan

[21] Appl. No.: 55,034

[22] Filed: Jul. 5, 1979

[30] Foreign Application Priority Data

Jul. 11, 1978 [JP] Japan .................. 53-84848

[51] Int. Cl.³ .......................... H02P 9/30; H02J 7/14
[52] U.S. Cl. ........................ 322/28; 322/73; 320/64; 307/10 BP
[58] Field of Search .................. 322/28, 59, 60, 72, 322/73; 320/64, 68; 307/10 BP

[56] References Cited

U.S. PATENT DOCUMENTS

| 3,443,200 | 5/1969 | Kuhn | 322/28 X |
| 3,491,285 | 1/1970 | Nowakowski | 322/28 X |
| 3,544,881 | 12/1970 | Raver et al. | 322/28 X |
| 3,835,363 | 9/1974 | Kirk | 322/73 X |
| 4,128,799 | 12/1978 | Morishima | 322/73 X |

*Primary Examiner*—Robert J. Hickey
*Attorney, Agent, or Firm*—Cushman, Darby & Cushman

[57] ABSTRACT

A semi-conductor voltage regulation system for a vehicle includes engine rise-up detection circuit and an oscillator circuit. The field exciting current is intermittently supplied by the oscillator circuit before the engine starts and continuously supplied after the engine has started so as to minimize battery discharge. The engine rise-up detection circuit changes its input impedance in accordance with the voltage applied thereto, whereby a highly reliable regulator with less heat generation may be obtained.

4 Claims, 5 Drawing Figures

VOLTAGE REGULATOR SYSTEM FOR VEHICLE GENERATOR

BACKGROUND OF THE INVENTION

The present invention relates to an improved voltage control circuit for a vehicle battery charging circuit and, more particularly, to a detecting circuit of a generator rise-up voltage in a voltage control circuit to prevent battery discharge even when an engine is stopped with the key switch being left closed.

Such a voltage control circuit is disclosed in a copending and co-assigned application Ser. No. 9359 filed on February, 1979.

The detecting circuit comprises a switching transistor for controlling field exciting current in accordance with rise-up voltage of a three-phase-Y-connected altenator windings having a full-wave rectifier. The base of the transistor is connected to the junction point of the three phase windings, in other words, the neutral point. When the alternator output voltage rises up, the voltage of the neutral point causes the switching transistor to be conductive to supply a full field exciting current.

However, in case the full-wave rectifier is subjected to salt water or muddy water, an electric leakage current path may be formed on the surface of the rectifier, through which a leakage current may flow from battery to the three phase windings, neutral point and to the input terminal of the transistor of the detecting circuit, with the result that the transistor may not control the field exciting current, when an engine is stopped with the key switch being left closed.

SUMMARY OF THE INVENTION

Therefore, it is a main object of the present invention to provide a battery discharge-free voltage regulator system for a vehicle generator which is resistive to salt water, moisture or mud.

It is another object of the present invention to provide a circuit for limiting or cutting the exciting current of the generator when the generator is not in operation, the circuit having an input impedance which becomes higher when the generator is in operation than in quiescence.

It is a further object of the present invention to provide an improved voltage regulator circuit suitable for integration into a small IC chip.

Other objects and features will be readily apparent from the following description and drawings.

DESCRIPTION OF THE PREFERRED EMBODIMENT

Figure 1:
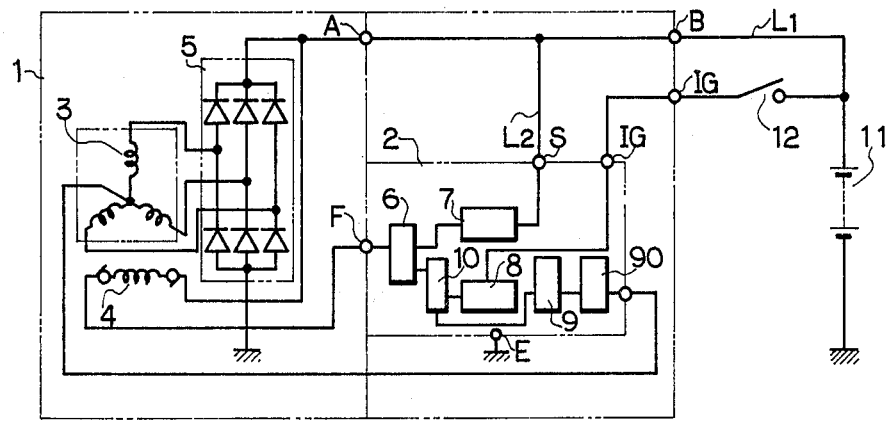
FIG. 1 is a circuit diagram showing a whole voltage regulator system according to the present invention.

A system according to the present invention will be described with reference to FIGS. 1 and 2. The system is generally comprised of a generator 1 and a voltage regulator circuit 2. The generator 1 is of a well-known type and has Y-connected three phase armature windings 3, a field coil 4 and a full-wave-three-phase rectifire 5.

The voltage regulator circuit 2 includes a well known type switching circuit such as a Darlington transistor 6 the collector-emitter path of which is connected in series with the field exciting coil, a voltage detecting circuit 7 for detecting a battery voltage to control the switching circuit 6, an oscillating circuit 8 such as an astable multivibrator which generates oscillating signals at a predetermined frequency and duty ratio of conducting period and nonconducting period when a key switch 12 is thrown to be closed until the engine and, consequently, generator rises up to its operation, a rise-up voltage detecting circuit 9 for detecting the rise-up of the generator or engine to interrupt the oscillating signal transmitted from the oscillating circuit 8 and a switch driving circuit 10 for driving the switching circuit 6 in response to the oscillating signal. The frequency and duty ratio is determined so that the generator may be excited by a minimum field exciting current to generate a predetermined voltage at a predetermined engine speed.

A battery 11 is connected to an output terminal A of the generator 1 through a terminal B on a line $L_1$. An ignition switch 12 is adapted to energize the oscillating circuit 8 when it is closed.

Figure 2:
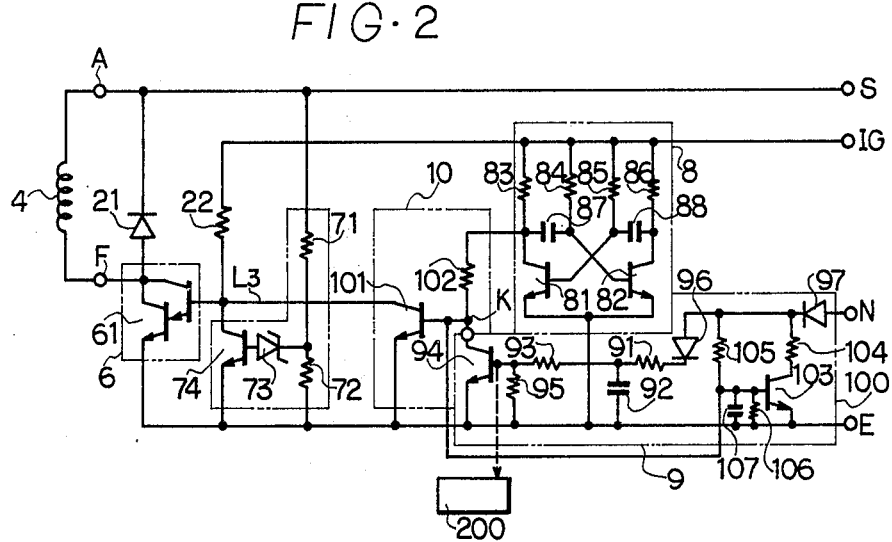
FIG. 2 is a main part of the above system

As shown in FIG. 2, the collector of the Darlington transistor 6 is further connected to a flywheel diode 21 which is in parallel with the field exciting coil 4 and the base of Darlington transistor 6 is connected to the voltage detecting circuit 7 and a terminal IG through a resistor 22. The voltage detecting circuit 7 consists of voltage dividing resistors 71 and 72, a zener diode 73 and a transistor 74. One end of the resistor 71 is connected to a terminal S which is in turn connected through line $L_2$ to the terminal B. Other connections are well known in the art. The base of the Darlington transistor 6 is also connected to the collector of a transistor 101 of the switch driving circuit 10.

The switch driving circuit 10 comprises, besides the transistor 101, a resistor 102 connected between the output terminal of the oscillating circuit 8 and the base of the transistor 101, which is in turn connected to the collector of an output transistor 94 of the rise-up voltage detecting circuit 9. The rise-up voltage detecting circuit 9 further includes a voltage smoothing circuit consisting of resistors 91 and 93 and a capacitor 92, a diode 97 and an impedance changing circuit 100 connected through a diode 97 across its input terminal N and earth terminal E. The input terminal N is connected to the neutral point of the Y-connected armature windings 3 as shown in FIG. 1.

The impedance changing circuit 100 comprises a transistor 103, its collector resistor 104, a resistor 105 connected between the base of the transistor 103 and the collector resistor 104 and a smoothing circuit consisting of a resistor 106 and a capacitor 107 connected across the base and emitter of the transistor 103. The base of the transistor 103 is further connected to the oscillating circuit 8 through the resistor 102.

When the transistor 94 is in the non-conductive state, oscillating signals of the oscillator are applied to the base circuit of the transistor 103 through the smoothing circuit (106 and 107), thereby rendering the transistor 103 to be conductive to connect the resistor 104 across the terminals N and E, with resultant decrease of the input impedance of the rise-up voltage detecting circuit 9.

As a result, even if a leakage current flows through a leakage path formed on the surface of the rectifier to the terminal N, it is almost bypassed through the transistor 104 and resistor 103 with a substantial voltage drop due to a high impedance of the leakage path so that the voltage applied to the base of the transistor 94 becomes lower than the threshold voltage thereof.

The resistor 91,93 and 95 are arranged so that the transistor 94 may not be rendered conductive by the oscillating signals applied through the diode 96, resistors 91 and 93.

When, on the other hand, the transistor 94 is in the conductive state, oscillating signals are bypassed thereby and no signal is applied to the base of the transistor 103. As a result, a high input impedance of the rise-up voltage detecting circuit 9 is obtained.

In operation, when the key switch 12 is closed and, also, a starter (not shown) is driven to start an internal combustion engine of a vehicle, the oscillator 8 is energized to generate oscillating signals. As a result, the switch driving circuit 10 makes the Darlington transistor 6 conductive and nonconductive periodically in response to the oscillating signals to supply a limited field exciting current to the field coil 4.

As the engine starts and increases its rotational speed, the voltage generated in the armature windings 3 increases gradually and, consequently, the voltage at the neutral point increases. Such a voltage is indicative of an engine or a generator operating condition and is applied to the base of the transistor 94 of the rise-up voltage detecting circuit 9 through the smoothing circuit (91, 92 and 93) and the impedance changing circuit 100. As far as the voltage at the neutral point is not high enough to render the transistor 94 to be conductive, the Darlington transistor 6 is controlled by the switch driving circuit 10 and only a limited current is supplied to the field coil.

In such a condition, oscillating signals are applied to the base circuit of the transistor 103, which is rendered to be conductive to lower the input impedance as described above.

When the engine operates and the neutral point voltage increases to a predetermined voltage, it is applied to the base of the transistor 94, which is rendered to be conductive so that the transistor 101 of the switch driving circuit 10 is rendered to be nonconductive.

It should be noted that since the armature windings have a low internal impedance, the neutral point voltage is not lowered even when a current flows through the bypassing circuit of the transistor 103 and resistor 104.

As a result, the Darlington transistor 6 is kept conductive by the base current supplied through the resistor 22 so that the generator 1 is fully excited to further increase the output voltage of the generator 3 thereby charging the battery 11. At the same time, the oscillating signals of the oscillating circuit 8 are bypassed by the transistor 94 and not transmitted to the base of the transistor 103 so that the transistor 103 is rendered to be non-conductive and the input impedance of the rise-up voltage circuit 9 is increased to lower heat generation thereof.

Figure 4:
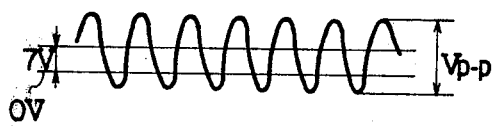
Figure 5:
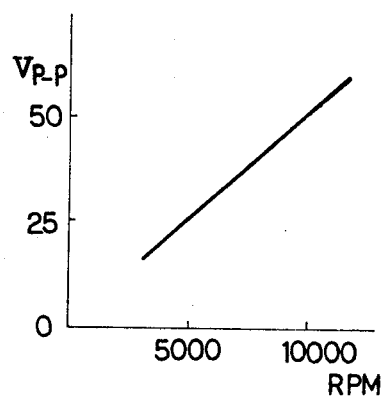

For example, when an alternator having the Y-connected windings the neutral point voltage wave and voltage-revolution characteristics of which are shown in FIGS. 4 and 5 is used and 200 ohms and 5 kilo ohms are used for the resistors 104 and 91 respectively, the heat generation of the both resistors can be limited within one half watts.

Figure 3:
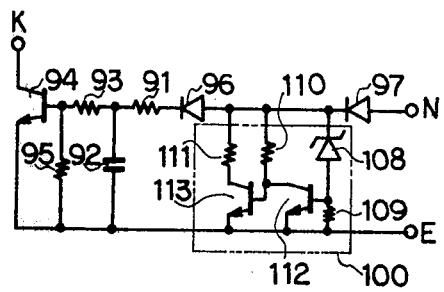
FIG. 3 is another embodiment of a rise-up voltage detecting circuit which is a main part of the present invention and FIGS. 4 and 5 respectively show voltage wave forms of the neutral point of an alternator and its voltage-revolution characteristics.

Another embodiment of the rise-up voltage detecting circuit 9 having the impedance changing circuit 100 will be described with reference to FIG. 3.

The impedance changing circuit 100 comprises transistors 112 and 113, a constant voltage diode 108 and resisters 109, 110 and 111. The resister 110 is greater in resistance than the resister 111. In this circuit, the input voltage of the terminal N is detected in order to change the input impedance.

When the neutral point voltage of the generator is lower than a voltage determined by the constant voltage diode 108, the transistor 113 is made conductive so that the resistor 111 is connected across the terminal N and E.

It should be noted that the voltage applied through a leakage path to the rise-up voltage detecting circuit 9 is lowered when a low impedance bypassing circuit is formed as mentioned before.

On the other hand, when the neutral point voltage exceeds a predetermined voltage, the Zener diode 108 conducts to drive the transistor 112 into the conductive state and the transistor 113 into the nonconductive state. As a result, the resistor 110 is connected across the terminal N and E in place of the resistor 111 so that the input impedance of the terminals N and E is changed to be higher than that when the neutral point voltage is lower than a predetermined voltage, thereby decreasing the heat generation of the rise-up voltage detection circuit.

When the battery voltage further increases, the transistor 74 of the voltage detecting circuit 7 controls the Darlington transistor 6 to thereby regulate the battery charging voltage in the well-known manner.

When the engine is stopped while the key switch is still left closed, the field exciting current is intermittently supplied by the Darlington transistor 6 in response to the oscillating signals in the same manner when the starter is first driven. However it should be noted that the field exciting current is limited such that it does not significantly cause discharge of a battery.

What is claimed is:

1. A voltage regulator for an automobile battery charging system including a key switch and generator with a field exciting coil and armature windings comprising:
   a switching circuit connected to said field exciting coil in a controlled manner,
   a battery voltage sensing circuit connected between said battery and said switching circuit for controlling the switching operation of said switching circuit and
   means connected between at least one of said armature windings and said switching circuit for controlling said switching circuit to limit said field exciting current when a voltage generated by said generator is lower than a predetermined value, said means including an input circuit having a low and high input impedance circuits for changing its input impedance from the low to high when the voltage generated by said generator is greater than the above said predetermined value, and from the high to low when the voltage generated by said generator is lower than said predetermined value.

2. A voltage regulator as claimed in claim 1, wherein said control means further includes an oscillating circuit for generating signals of a constant frequency and intermittently supplies said field exciting current in accordance with said signals.

3. A voltage regulator as claimed in claim 1, wherein said control means further includes:

an oscillating circuit for generating oscillating signals having a predetermined duty cycle and a control transistor circuit connected between said oscillating circuit and said input circuit for transmitting said oscillating signals to said switching circuit to limit said field exciting current and to said input circuit to provide said low input impedance when the voltage generated by said generator is lower than said predetermined value and for interrupting transmission of the signals either to said switching circuit or to said input circuit when the voltage generated by said generator is higher than said predetermined value.

4. A voltage regulator as claimed in claim 3, wherein said input circuit includes:

a pair of input terminals connected to at least one of said armature windings for receiving voltage generated by said generator, a transistor having an emitter, a collector and a base, a low impedance circuit including a series circuit of the collector-emitter path of said transistor and a resistor, means connecting the base of said transistor and control transistor circuit and a smoothing circuit having a resistor and capacitor connected to the base of said transistor for providing a signal to render said transistor to be conductive when said oscillating signals are applied thereto.

* * * * *